United States Patent
Song et al.

[19]

[11] Patent Number: 5,882,552
[45] Date of Patent: Mar. 16, 1999

[54] METHOD FOR RECYCLING FUEL SCRAP INTO MANUFACTURE OF NUCLEAR FUEL PELLETS

[75] Inventors: Kun-Woo Song; Keon-Sik Kim; Jong-Hun Kim; Youn-Ho Jung, all of Daejeon-Si, Rep. of Korea

[73] Assignees: Korea Atomic Energy Research Institute, Daejeon-Si; Korea Electric Power Corporation, Seoul, both of Rep. of Korea

[21] Appl. No.: 932,602

[22] Filed: Sep. 17, 1997

[30] Foreign Application Priority Data

Jun. 27, 1997 [KR] Rep. of Korea .................. 1997-28268

[51] Int. Cl.⁶ .................................................. G21C 21/00
[52] U.S. Cl. ........................ 264/0.5; 264/37.1; 264/37.29
[58] Field of Search ..................................... 264/0.5, 37.1, 264/37.29

[56] References Cited

U.S. PATENT DOCUMENTS

| | | | |
|---|---|---|---|
| 3,140,151 | 7/1964 | Foltz et al. | 264/0.5 |
| 3,294,493 | 12/1966 | Jonke et al. | 264/0.5 |
| 3,343,926 | 9/1967 | Knudsen et al. | 264/0.5 |
| 3,578,419 | 5/1971 | Welty | 264/0.5 |
| 4,643,873 | 2/1987 | Hayes | 264/0.5 |

*Primary Examiner*—Christopher A. Fiorilla
*Attorney, Agent, or Firm*—Nikaido Marmelstein Murray & Oram, LLP

[57] ABSTRACT

A method is disclosed in which fuel scrap of $UO_2$ alone or $UO_2$ containing an oxide of plutonium, gadolinium or erbium is recycled into the manufacture of nuclear fuel pellets. The fuel scrap consisting of defective fuel pellets is comminuted through oxidation to fuel particles of $U_3O_8$ alone or $U_3O_8$ containing an oxide of plutonium, gadolinium or erbium, and a sintering aid containing an element selected from the group consisting of aluminum, magnesium, niobium, titanium, vanadium, chromium, lithium, silicon, tin and mixtures thereof is added in a quantity of about 0.02% to about 2% by weight to the sintering powder which consists of said recycled fuel particles and fresh fuel powder having a composition of $UO_2$ alone or $UO_2$ in a mixture of $PuO_2$, $Gd_2O_3$ or $Er_2O_3$. The sintering powder is then mixed uniformly, in which the amount of the recycled fuel particles is in the range of about 10% to about 100% by weight. Green pellets are made by pressing the sintering powder and then sintered at about 1500° C. to about 1800° C. in a reducing atmosphere to produce new fuel pellets.

36 Claims, 1 Drawing Sheet

METHOD FOR RECYCLING FUEL SCRAP INTO MANUFACTURE OF NUCLEAR FUEL PELLETS

BACKGROUND OF THE INVENTION

1. Field of the Invention

This invention relates to the recycle of defective fuel pellets having a composition of $UO_2$ alone or $UO_2$ containing an oxide of plutonium, gadolinium or erbium into the manufacture of new fuel pellets. Particularly this invention relates to a method for comminuting defective fuel pellets through oxidation to fuel particles of $U_3O_8$ alone or $U_3O_8$ containing an oxide of plutonium, gadolinium or erbium, adding a sintering aid to the sintering powder which consists of said recycled fuel particles and fresh fuel powder of $UO_2$ alone or $UO_2$ in a mixture of $PuO_2$, $Gd_2O_3$ or $Er_2O_3$, mixing the sintering powder uniformly, pressing the sintering powder into green pellets, and sintering green pellets in a reducing atmosphere to make new fuel pellets.

2. Description of Prior Art

The common method used to fabricate fuel pellets of $UO_2$ alone or $UO_2$ containing an oxide of plutonium, gadolinium or erbium consists of the following steps ; mixing or homogenizing fresh fuel powder, cold-pressing powder into green pellets, sintering green pellets in a reducing atmosphere at a temperature of at least 1500° C., to achieve density of about 95% TD (theoretical density is 10.96 g/cm$^3$), and then grinding sintered pellets to a diameter set by specification.

Nuclear fuel pellets used in nuclear power reactors must meet stringent fuel specifications in order to allow efficient and economical operation of the power reactors.

During sintering, some pellets have cracks or deform into an "hour-glass" shape having a central diameter too small for use, and sludge is also produced during grinding. Pellet chips can be produced during handling. In addition, the corresponding batch will be sometimes defective pellets if the sample representing one batch does not meet fuel specification. Since defective fuel pellets and grinding sludge are expensive and radioactive, they can not be discarded. Under a normal operation of fabrication, plant fuel scrap is recycled into the manufacture of new fuel pellets.

The art commonly used in recycling $UO_2$ fuel scrap is known. Defective $UO_2$ pellets are comminuted to $U_3O_8$ particles through the oxidation at a temperature in the range of 400° C. to 700° C. for 2 to 4 hours under a flowing air. Recycled $U_3O_8$ particles and grinding sludge are mixed with fresh $UO_2$ powder, and then the mixed powder is pressed and sintered to produce new $UO_2$ fuel pellets. However, recycled $U_3O_8$ particles and grinding sludge are much less sinterable than fresh $UO_2$ powder, and, in particular, especially recycled $U_3O_8$ particles cause more complicated problem since the reduction of $U_3O_8$ to $UO_2$ makes pores in the fuel pellet during sintering in a reducing atmosphere. It is known that the sintered density of fuel pellet decreases with the contents of recycled $U_3O_8$ particle and grinding sludge, so the amounts of recycled $U_3O_8$ particle and grinding sludge which can be directly mixed with fresh $UO_2$ powder are limited within about 7% and about 3% by weight, respectively, in order to avoid excessive density drop.

In case a large amount of defective $UO_2$ pellets has to be recycled, the prior art described above will not be an effective method since the amount of recycled $U_3O_8$ particle which can be directly mixed with fresh $UO_2$ powder is restricted, which means that it will take a long time for defective pellets to be recycled. Moreover, the remaining defective pellets will have to be stored for a very long time, if new fuel pellets of which $U^{235}$ enrichment is different from that of scrap material are fabricated before all the defective $UO_2$ pellets are recycled. Recently, the amount of recycled $U_3O_8$ particle to be added to fresh $UO_2$ powder is much restricted since fuel density is controlled to be in a higher range within fuel specification.

The problem that the amount of fuel scrap which can be directly recycled is limited is common to the manufacture of not only $UO_2$ fuel but also $UO_2$ fuel containing an oxide of plutonium, gadolinium or erbium. When $UO_2$ fuel containing an oxide of plutonium, gadolinium or erbium is produced, this problem is much aggravated since these fuels are less sinterable than $UO_2$ fuel. Thus the amount of fuel scrap which can be directly recycled will be much smaller.

In order to overcome the above problem, the arts have been disclosed in which fuel scrap is treated entirely to be sinterable powder suitable for the manufacture of new fuel pellets. U.S. Pat. No. 3,578,419, U.S. Pat. No. 3,294,493, U.S. Pat. No. 3,140,151, U.S. Pat. No. 3,343,926, and European Pat. No. 84 129 describe methods of processing fuel scrap through oxidation and reduction in a fluidized bed; fuel scrap consisting of defective pellets and grinding sludge is oxidized to $U_3O_8$ particle, which is then reduced to $UO_2$ particle, and the $UO_2$ particle so produced is subsequently oxidized and reduced up to 5 times. Particle size becomes smaller due to the repeated oxidation-reduction cycle, and thus sinterable $UO_2$ powder can be produced in at least one oxidation-reduction cycle. Specific fluidized beds and processing variables such as temperatures for oxidation and reduction and/or gas composition are disclosed. However, disadvantages of the above art that a fluidized bed has to be additionally provided and powder treatments are hard to control. Oxidation rate of $UO_2$ powder is much faster than that of defective $UO_2$ pellets and thus resultant reaction heat can increase the temperature of powder above 800° C. The powder so produced has unexpectedly a very low surface area and thus is poorly sinterable.

SUMMARY OF THE INVENTION

Briefly stated, the above disadvantages of the prior art are overcome by the present invention. The principal object of this invention is to provide a method for recycling fuel scrap entirely in the manufacture of new fuel pellets by using a sintering aid.

With foregoing object and other objects in view, there is provided in accordance with the invention a method for the recycling of defective fuel pellets which have a composition of $UO_2$ alone or $UO_2$ containing an oxide of plutonium, gadolinium or erbium, by comminuting the defective pellets to fuel particles of $U_3O_8$ alone or $U_3O_8$ containing an oxide of plutonium, gadolinium or erbium through oxidation at a temperature in the range of about 300° C. to about 800° C. in an oxidizing gas, by adding a sintering aid to the sintering powder which consists of the recycled fuel particles and fresh fuel powder of $UO_2$ alone or $UO_2$ in a mixture of $PuO_2$, $Gd_2O_3$ or $Er_2O_3$, by mixing uniformly the sintering powder, by cold-pressing the sintering powder into green pellets, and by sintering in a reducing atmosphere at a temperature in the range of 1500° C. to 1800° C. for 1 to 20 hours.

A method according to the invention is characterized in that the sintering aid is an oxide or a compound containing an element selected from the group consisting of Nb, Ti, Li, Al, Mg, V, Sn, Cr, Si and mixtures thereof, and that the amount of the sintering aid, on said element basis, is in the range of about 0.02% to about 2% by weight with respect to the sintering powder.

A method according to the invention is characterized in that the amount of the recycled fuel particle which can be directly mixed with the fresh fuel powder is not limited, ranging from about 10% to about 100% by weight with respect to the sintering powder.

Advantage accomplished by the invention is that a fluidized bed and related powder treatments are not needed. Another advantage is that the recycle of fuel scrap is easily incorporated in the main production line of fuel pellets since the mixed ratio of recycled fuel particle to fresh fuel powder can be flexibly determined in the range of about 10% to about 100% by weight.

BRIEF DESCRIPTION OF THE DRAWINGS

Details of the invention will be further understood upon reference to FIG. 1 in which a schematic flowchart shows the manufacturing steps of nuclear fuel pellets including the recycling of fuel scrap.

DETAILED DESCRIPTION OF THE INVENTION

Figure 1:
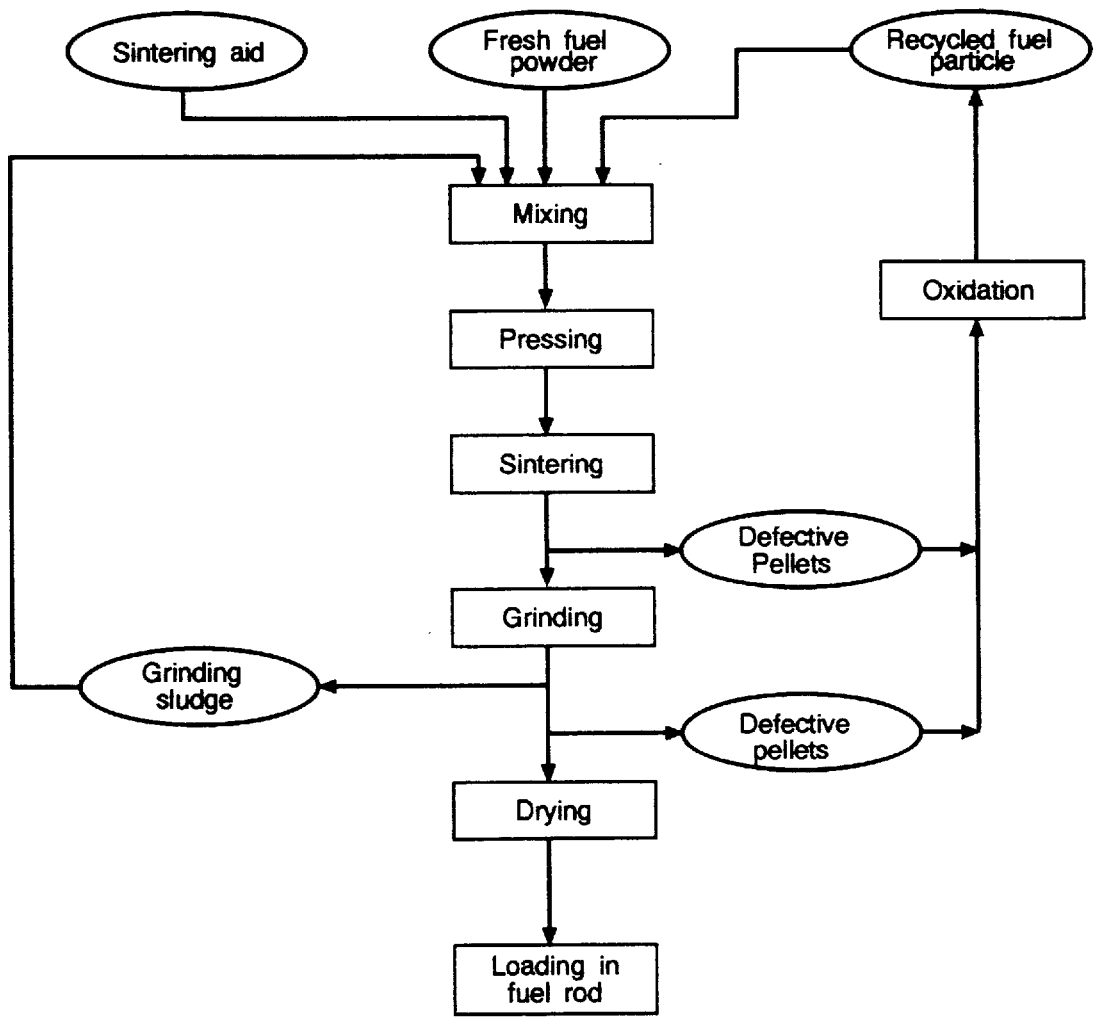

It is well known that sintering aids, for example, $Nb_2O_5$ and $TiO_2$, increase substantially the grain size and plasticity of $UO_2$ fuel pellets when being mixed with $UO_2$ powder, pressed and sintered. But sintering aids have a negligible effect on the densification of $UO_2$ green pellet. The published literature, entitled "$UO_2$ fuel pellet microstructure modification through impurity additions" by K. C. Radford and J. M. Pope in Journal of Nuclear Materials 116(1983) 305–313, reported that the $UO_2$ green pellet containing $Nb_2O_5$, $TiO_2$ or $V_2O_5$ in a quantity of 0.05% to 0.5% by weight densified faster at a temperature of 1300° C. to 1500° C. than pure $UO_2$ green pellet, but that its final density achieved at about 1700° C. was slightly lower than pure $UO_2$ green pellet, suggesting that the effect of sintering aids on the densification of $UO_2$ green pellets is negligible. An attempt to increase the density of $UO_2$ pellet through sintering aids has not been practically advantageous, because fresh $UO_2$ powder has been inherently so sinterable as to produce a fuel pellet having a density of 95% TD.

Sintering aids have not been used to recycle fuel scrap until now. We have found that a sintering aid increases enormously the sintered density of the green pellet consisting of fresh $UO_2$ powder and recycled $U_3O_8$ particles, of which densification is originally very poor. The invention according to our finding provides a method for recycling fuel scrap into the manufacture of new fuel pellets.

Nuclear fuel pellets of $UO_2$ alone or $UO_2$ containing an oxide of plutonium, gadolinium or erbium are commonly produced through the manufacturing steps shown in FIG. 1. As described in "background of the invention", fuel scrap consisting of defective fuel pellets and grinding sludge is made in the sintering and grinding steps. If green pellets are defective in the pressing step, they should be sintered to make defective fuel pellets, which are a suitable form for the recycling. Defective fuel pellets are comminuted to fuel particles through oxidation in a furnace, and then a sintering aid is added in the mixing step to the sintering powder consisting of the recycled fuel particles, fresh fuel powder and grinding sludge. The sintering powder containing the recycled fuel particles in the range of about 10% to about 100% by weight is processed according to the normal manufacturing steps of fuel pellets: mixing, pressing, sintering and grinding. The sintered pellet so produced is loaded into a cladding tube and enclosed.

Detailed description of the method for recycling fuel scrap consisting of defective pellets and grinding sludge is as follows:

Defective fuel pellets of $UO_2$ alone or $UO_2$ containing an oxide of plutonium, gadolinium or erbium are heat-treated in boats in a furnace at a temperature in the range of about 300° C. to about 800° C. in an oxidizing gas, which is selected from the group consisting of air, oxygen, a mixture of air and inert gas and a mixture of oxygen and inert gas, until defective fuel pellets are comminuted to fuel particles of $U_3O_8$ alone or $U_3O_8$ containing an oxide of plutonium, gadolinium or erbium. Oxidation rate is naturally slow in lower temperatures and also progresses slowly in a higher temperatures due to the formation of dense and protective layer. It is preferred to oxidize defective pellets in a flowing air at a temperature in the range of about 350° C. to about 700° C., in which the sizes of recycled fuel particles become smaller as oxidation temperature decreases. Defective fuel pellets are easily comminuted to fuel particles through the above treatment, since large stress is generated during the oxidation due to the fact that $U_3O_8$ has a lattice volume larger by about 30% than $UO_2$. The recycled fuel particle has a particle size in the range of about 3 $\mu$m to about 100 $\mu$m and a specific surface area in the range of about 0.1 $m^2$/g to about 1.0 $m^2$/g. The recycled fuel particles should be screened to remove large agglomerates.

Comparing with defective $UO_2$ pellets, the defective pellet which has a composition of not only $UO_2$ but an oxide of plutonium, gadolinium or erbium oxidizes slowly and its recycled fuel particle becomes coarse. Oxidation temperature and time are properly adjusted depending on scrap materials.

The recycled fuel particle is optionally treated again ; the recycled fuel particle is reduced to a lower oxidation state and/or the resulting oxide is oxidized and reduced at least once, or is mechanically milled. However, such extra treatments are not needed in normal practice according to the invention.

The recycled fuel particle and the fresh fuel powder having a composition of $UO_2$ alone or $UO_2$ in a mixture of $PuO_2$, $Gd_2O_3$ or $Er_2O_3$ constitute sintering powder, in which the amount of the recycled fuel particle is in the range of about 10% to about 100% by weight. Grinding sludge may be added to the sintering powder.

A sintering aid which is an oxide and a compound containing an element selected from the group consisting of Nb, Ti, Li, V, Mg, Al, Sn, Si, Cr and mixtures thereof, is added in a quantity of about 0.02% to about 2% by weight, on said element basis, to the sintering powder. The sintering powder is then mixed uniformly. In case that $UO_2$ fuel containing an oxide of plutonium, gadolinium or erbium is fabricated, the sintering powder is optionally milled to increase its sinterability.

The sintering powder so produced is then pressed and sintered in the same way as normal fuel powder. The sintering powder is cold-pressed in a mold under a pressure of about 2 ton/$cm^2$ to about 5 ton/$cm^2$ to produce green pellets having about 40% to 65% TD (theoretical density). If the powder is not so flowable as to be pressed directly, it is pre-pressed under a lower pressure into slugs, which are broken up into granules having good flowability. Green pellets are heated to a temperature in the range of about 1500° C. to about 1800° C. and held for about 1 to about 20 hours in a sintering gas atmosphere.

The sintering gas atmosphere should be reducing to make stoichiometric fuel, so it is selected from the group consisting of hydrogen, a mixed gas of hydrogen and inert gases such as argon and nitrogen, a mixed gas of carbon dioxide and carbon monoxide, and a mixed gas of hydrogen and carbon dioxide. Additionally the sintering gas atmosphere includes a small amount of water vapor to control the oxidation potential of sintering atmosphere. In case $UO_2$ containing an oxide of plutonium, gadolinium or erbium is sintered, a sintering gas atmosphere is commonly humidified to increase grain size of the sintered pellet.

The sintered pellet so produced has a density in the range of about 94% TD to about 97% TD and thus meets fuel specification. In addition, it has a grain size larger than about 20 μm, so fission products will remain more trapped in the fuel pellets. The increase in density is below 1% TD after the resintered test carried out at 1700° C. for 24 hours in hydrogen, so sintered pellets are thermally stable.

In case the sintering aid is not added to the sintering powder consisting of fresh fuel powder and the recycled fuel particle, sintered density decreases linearly with the content of the recycled fuel particles, which is not allowed over about 10% by weight due to the density drop.

The sintering atmosphere is controlled depending on the sintering aid. It has been found that $Nb_2O_5$ which was added as a sintering aid does not dissolve completely in $UO_2$ matrix during sintering in a dry hydrogen and consequently does not enhance the densification of green pellets. In order to dissolve $Nb_2O_5$, hydrogen gas should include a small amount of water vapor which is equivalent to a dew point of about 20° C. If $Al_2O_3$ or MgO is a sintering aid being added, the oxidation potential of sintering atmosphere is kept higher to dissolve it, which can be controlled by the mixed gas having a composition in the range of about 5% to about 40% carbon dioxide by volume with the balance being hydrogen.

DESCRIPTION OF PREFERRED EMBODIMENTS

The following examples illustrate a preferred method for recycling defective $UO_2$ fuel pellets by using a sintering aid. However, these examples should be understood to in no way limit the scope of the invention which is defined by the appended claims.

EXAMPLE I

Defective $UO_2$ pellets of about 150 g were put in a boat, heated in a lab furnace to 400° C. under a flowing air, and held for 4 hours. Temperature measured by the thermocouple attached to the boat indicated that temperature rose to 450° C. due to the exothermic oxidation of $UO_2$ to $U_3O_8$. The defective pellets were comminuted to $U_3O_8$ particles, which were then passed a 200 mesh sieve to remove large agglomerates. The recycled $U_3O_8$ particle has an average particle size of about 8 μm and an average specific surface area of 0.6 m²/g. SEM micrographs of recycled $U_3O_8$ particle indicated that the defective pellet was comminuted by intergranular cracking.

$UO_2$ powder was used which was obtained through the AUC (Ammonium Uranyl Carbonate) route. The $UO_2$ powder had an average particle size of about 20 μm, and a particle consisted of many primary crystallites of smaller than about 0.1 μm. This powder had a spherical shape and was free flowing enough to be pressed directly into green pellets without granulation.

Starting powders were prepared by mixing $UO_2$ powder with recycled $U_3O_8$ particle in so-called "Turbula" for 1 hour, in which the amounts of recycled $U_3O_8$ particle were 0%, 10%, 20%, 30%, 40%, 60%, 80% and 100% by weight. These starting powders were pressed and sintered for the control pellets.

In addition, $Nb_2O_5$ powders in quantities of 0.3% and 0.5% by weight were added to the starting powders (8 compositions), respectively, and mixed again.

Powders were directly pressed at a pressure of 3 ton/cm² in a mold whose wall was deposited with zinc stearate for lubrication, and green pellets so produced were in good mechanical condition. Green pellets were heated in a furnace to 1680° C. at the rate of 5° C./min under a flowing hydrogen, held for 4 hours and cooled down.

It was found that $Nb_2O_5$ did not completely dissolve in $UO_2$ matrix during the sintering under a dry hydrogen gas, so it was preferred that hydrogen gas had a dew point of about 20° C. The density of sintered pellet was determined by water immersion method.

In Table I, green and sintered densities for example I are given. In the case of the control pellets, the sintered density decreases linearly with the amount of recycled $U_{3O8}$ particle in the starting powder, so the $UO_2$ pellets produced from the starting powders which contain $U_3O_8$ particle more than 10% by weight have lower density than the density limit (94% TD) set by fuel specification.

In the case of the addition of $Nb_2O_5$ in quantities of 0.3% and 0.5% by weight, the fuel pellets produced from starting powders which contain the recycled $U_3O_8$ particle more than 10% by weight have densities higher than 94% TD (10.30 g/cm³). The fuel pellets containing 0.3 weight % $Nb_2O_5$ are have a grain size in the range of 25 μm to 30 μm (linearly intercepted), and those containing 0.5 weight % $Nb_2O_5$ have a grain size in the range of 40 μm to 45 μm.

The resintered test carried out at 1700° C. for 24 hours in hydrogen showed that the increase in density ranged from 0.6% TD to 0.9% TD, indicating that the sintered pellets were thermally stable.

TABLE I

Sintered densities of $UO_2$ pellets and $Nb_2O_5$-doped $UO_2$ pellets produced from the starting powder consisting of AUC-$UO_2$ and recycled $U_3O_8$.

| Content of recycled $U_3O_8$ in starting powder (wt %) | Density of green pellet (g/cm³) | Sintered density of control pellet (g/cm³) | Sintered density of 0.3 wt % $Nb_2O_5$-doped $UO_2$ pellet (g/cm³) | Sintered density of 0.5 wt % $Nb_2O_5$-doped $UO_2$ pellet (g/cm³) |
| --- | --- | --- | --- | --- |
| 0 wt % | 5.79 | 10.53 | 10.60 | 10.71 |
| 10 wt % | 5.79 | 10.31 | 10.52 | 10.65 |

TABLE I-continued

Sintered densities of $UO_2$ pellets and $Nb_2O_5$-doped $UO_2$ pellets produced from the starting powder consisting of AUC-$UO_2$ and recycled $U_3O_8$.

| Content of recycled $U_3O_8$ in starting powder (wt %) | Density of green pellet (g/cm³) | Sintered density of control pellet (g/cm³) | Sintered density of 0.3 wt % $Nb_2O_5$-doped $UO_2$ pellet (g/cm³) | Sintered density of 0.5 wt % $Nb_2O_5$-doped $UO_2$ pellet (g/cm³) |
|---|---|---|---|---|
| 20 wt % | 5.79 | 10.06 | 10.45 | 10.61 |
| 30 wt % | 5.75 | 9.85 | 10.49 | 10.64 |
| 40 wt % | 5.73 | 9.46 | 10.49 | 10.64 |
| 60 wt % | 5.70 | 8.94 | 10.33 | 10.59 |
| 80 wt % | 5.66 | 8.45 | 10.35 | 10.59 |
| 100 wt % | 5.59 | break | 10.32 | 10.64 |

EXAMPLE II

The method was repeated as in EXAMPLE I except that $TiO_2$ in quantities of 0.1% and 0.2% by weight, instead of $Nb_2O_5$, were added. The sintered densities for EXAMPLE II are given in TABLE II, in which the $TiO_2$-doped $UO_2$ pellets produced from the starting powders containing the recycled $U_3O_8$ particle more than 10% by weight have densities higher than 94% TD.

TABLE II

Sintered densities of $UO_2$ pellets and $TiO_2$-doped $UO_2$ pellets produced from the starting powder consisting of AUC-$UO_2$ and recycled $U_3O_8$.

| Content of recycled $U_3O_8$ in starting powder (wt %) | Density of green pellet (g/cm³) | Sintered density of control pellet (g/cm³) | Sintered density of 0.1 wt % $TiO_2$-doped $UO_2$ pellet (g/cm³) | Sintered density of 0.2 wt % $TiO_2$-doped $UO_2$ pellet (g/cm³) |
|---|---|---|---|---|
| 0 wt % | 5.79 | 10.53 | 10.72 | 10.75 |
| 10 wt % | 5.79 | 10.31 | 10.62 | 10.66 |
| 20 wt % | 5.79 | 10.06 | 10.54 | 10.60 |
| 30 wt % | 5.75 | 9.85 | 10.36 | 10.42 |
| 40 wt % | 5.73 | 9.45 | 10.31 | 10.38 |
| 60 wt % | 5.70 | 8.94 | 10.32 | 10.34 |
| 80 wt % | 5.66 | 8.45 | 10.30 | 10.34 |
| 100 wt % | 5.59 | break | 10.32 | 10.37 |

The grain sizes of these pellets are in the range of 30 $\mu$m to 60 $\mu$m (linearly intercepted), decreasing with the content of recycled $U_3O_8$ particle in the starting powder. The resintered test carried out at 1700° C. for 24 hours in hydrogen showed that the increase in density ranged from 0.6% TD to 0.9% TD, indicating that the sintered pellets were thermally stable.

If an excessive amount of $TiO_2$ is added, a considerably second phase which seems to be a liquid phase at a sintering temperature, forms in grain boundary. Massive formation of this phase will be detrimental to in-reactor fuel performance since material transport would be accelerated through this phase.

EXAMPLE III

The method was repeated as in EXAMPLE I except that $Li_2O$ in quantities of 0.1% and 0.2% by weight, instead of $Nb_2O_5$, were added. The sintered densities for EXAMPLE III are given in TABLE III, in which sintered densities of $Li_2O$-doped $UO_2$ pellets are higher than those of undoped $UO_2$ pellets. $Li_2O$ has an advantage that it vaporizes during sintering and thus remains in the sintered pellet with much smaller quantity than the initially added. $Li_2O$-doped $UO_2$ pellets have grain sizes larger than 100 $\mu$m.

TABLE III

Sintered densities of $UO_2$ pellets and $Li_2O$-doped $UO_2$ pellets produced from the starting powder consisting of AUC-$UO_2$ and recycled $U_3O_8$.

| Content of recycled $U_3O_8$ in starting powder (wt %) | Density of green pellet (g/cm³) | Sintered density of undoped $UO_2$ pellet (g/cm³) | Sintered density of 0.1 wt % $Li_2O$-doped $UO_2$ pellet (g/cm³) | Sintered density of 0.2 wt % $Li_2O$-doped $UO_2$ pellet (g/cm³) |
|---|---|---|---|---|
| 0 wt % | 5.79 | 10.53 | 10.47 | 10.31 |
| 10 wt % | 5.79 | 10.31 | 10.43 | 10.33 |
| 20 wt % | 5.79 | 10.06 | 10.26 | 10.25 |

EXAMPLE IV

This example describes the case that $UO_2$ powder obtained through the ADU (Ammonium Diuranate) route is used. This ADU-$UO_2$ powder is different from the AUC-$UO_2$ powder in that it has an average particle size of about 2 $\mu$m and is much agglomerated. The ADU-$UO_2$ powder can not be pressed directly due to the lack of flowability, so it needs granulation prior to pressing into green pellets.

$U_3O_8$ particle was produced in the same manner as that in EXAMPLE I. Starting powders were prepared by mixing fresh $UO_2$ powder with the recycled $U_3O_8$ particle in so-called "Turbula" for 1 hour, in which the amounts of recycled $U_3O_8$ particle were 0% and 40% by weight. These starting powders were pre-pressed, pressed and sintered for the control pellets.

In addition, $Nb_2O_5$ powder in a quantity of 0.3% and $TiO_2$ powder in a quantity of 0.1% by weight were added to the starting powders (2 compositions), respectively, and mixed again.

Powder mixtures were pre-pressed at a pressure of 1 ton/$cm^2$ into slugs, which were broken up on the 35 mesh sieve and then passed it. Granules so produced were mixed with zinc stearate in a quantity of 0.2% by weight, and then pressed into green pellets in a mold at a pressure of 3 ton/$cm^2$. Green pellets were then heated in a sintering furnace to 1680° C. at the rate of 5° C./min under a flowing hydrogen and held for 4 hours and cooled down. The sintering procedures in the case of $Nb_2O_5$ addition and $TiO_2$ addition are the same as those in EXAMPLE I and EXAMPLE II, respectively.

In Table IV, green and sintered densities for EXAMPLE IV are given. In the case of the control pellets sintered density decreases quite a lot due to the recycled $U_3O_8$ particle in the starting powder. When $TiO_2$ and $Nb_2O_5$ were added in quantities of 0.1% and 0.3% by weight, respectively, the fuel pellets produced from the starting powder containing the recycled $U_3O_8$ particle in a quantity of 40% by weight have densities higher than 94% TD.

If the sintered density will be higher than the limit set by fuel specification, a pore former is additionally added to decrease the density, which is a normal practice in sintering the $UO_2$ powder produced from the ADU route.

The resintered test carried out at 1700° C. for 24 hours in hydrogen showed that the increase in density was less than 1% TD.

TABLE IV

Sintered densities of $UO_2$ pellets and $Nb_2O_5$-doped and $TiO_2$-doped $UO_2$ pellets produced from the starting powder consisting of AUC-$UO_2$ and recycled $U_3O_8$.

| Content of recycled $U_3O_8$ in starting powder (wt %) | Density of green pellet (g/$cm^3$) | Sintered density of undoped $UO_2$ pellet (g/$cm^3$) | Sintered density of 0.3 wt % $Nb_2O_5$-doped $UO_2$ pellet (g/$cm^3$) | Sintered density of 0.1 wt % $TiO_2$-doped $UO_2$ pellet (g/$cm^3$) |
|---|---|---|---|---|
| 0 wt % | 5.54 | 10.70 | 10.84 | 10.80 |
| 40 wt % | 5.73 | 10.03 | 10.76 | 10.57 |

What is claimed is:

1. A method for manufacturing new fuel pellets by recycling defective fuel pellets of $UO_2$ or $UO_2$ containing an oxide of plutonium, gadolinium or erbium, comprising the following steps (a) heating said defective fuel pellets at a temperature in the range of about 300° C. to about 800° C. in an oxidizing gas to oxidize $UO_2$ to $U_3O_8$ in order to make fuel particles of $U_3O_8$ or $U_3O_8$ containing an oxide of plutonium, gadolinium or erbium;

(b) mixing said fuel particles with fresh fuel powder of $UO_2$ or $UO_2$ containing an oxide of plutonium, gadolinium or erbium to form a sintering powder comprising said fresh fuel powder and at least about 20% by weight of said fuel particles;

(c) mixing said sintering powder uniformly with a sintering aid, which sintering aid comprises an element selected from the group consisting of aluminum, magnesium, niobium, titanium, vanadium, chromium, lithium, silicon, tin and mixtures thereof, to make a product A;

(d) pressing said product A into green pellets of about 40% to about 65% theoretical density; and thereafter (e) sintering said green pellets at a temperature in the range of about 1500° C. to about 1800° C. in a reducing atmosphere to produce new fuel pellets.

2. The method of claim 1, wherein said sintering step is carried out for about 1–20 hours.

3. The method of claim 1, wherein said fuel particles are reduced to a lower oxidation state to produce an oxide B before step (b).

4. The method of claim 3, further comprising oxidizing and reducing said oxide B at least once before step (b).

5. The method of claim 1, further comprising screening said fuel particles to remove agglomerates before step (b).

6. The method of claim 5, wherein said screening step is conducted by passing said fuel particles through a 200 mesh sieve.

7. The method of claim 1, wherein said fuel particles are milled before step (b).

8. The method of claim 1, wherein said sintering powder consists of at least 20% by weight of said fuel particles with the remainder being said fresh fuel powder and a grinding sludge.

9. The method of claim 1, wherein said sintering powder is mixed with an amount of said element of about 0.02% to about 2% by weight, based on the weight of said sintering powder.

10. The method of claim 9, wherein said sintering powder is mixed with niobium oxide in an amount, calculated as niobium, of about 0.1% to about 1% by weight, based on the weight of of said sintering powder.

11. The method of claim 9, wherein said sintering powder is mixed with a titanium oxide in an amount, calculated as titanium, of about 0.05% to about 1% by weight, based on the weight of said sintering powder.

12. The method of claim 1, wherein said reducing atmosphere is selected from the group consisting of hydrogen, a mixture of hydrogen and inert gases, a mixture of hydrogen and carbon dioxide, a mixture of hydrogen and carbon monoxide, and mixtures thereof.

13. The method of claim 12, wherein said sintering aid comprises an oxide of aluminum or magnesium and said reducing atmosphere consists of about 5% to about 40% carbon dioxide by volume and the remainder being hydrogen.

14. The method of claim 1, wherein water vapor is added to said reducing atmosphere to control the oxidation potential of said reducing atmosphere.

15. The method of claim 14, wherein water vapor is added to said reducing atmosphere in an amount yielding a reducing atmosphere with a dew point of about 20° C.

16. The method of claim 1, wherein said step (a) comprises heating said defective fuel pellets at a temperature in the range of about 350° C. to about 700° C. in flowing air to make fuel particles of $U_3O_8$ or $U_3O_8$ containing an oxide of plutonium, gadolinium or erbium.

17. The method of claim 1, wherein the oxidizing gas is selected from the group consisting of air, oxygen, a mixture of air and an inert gas, and a mixture of oxygen and an inert gas.

18. A method for manufacturing new fuel pellets by recycling defective fuel pellets of $UO_2$, comprising the following steps
   (a) heating said defective fuel pellets at a temperature of 400° C. under flowing air for 4 hours to to oxidize $UO_2$ to $U_3O_8$ in order to make fuel particles of $U_3O_8$;
   (b) passing said fuel particles through a 200 mesh sieve to remove large agglomerates;
   (c) mixing said fuel particles with fresh fuel powder of $UO_2$ to form a sintering powder comprising said fresh fuel powder and at least 20% by weight of said fuel power;
   (d) mixing said sintering powder uniformly with 0.3–0.5%, calculated as niobium, by weight of $Nb_2O_5$, based on the weight of said sintering powder to make a product A;
   (e) pressing said product A into green pellets; and thereafter
   (f) sintering said green pellets at a temperature of 1680° C. for 4 hours in hydrogen having a dew point of about 20° C. to produce new fuel pellets.

19. A method for manufacturing new fuel pellets by recycling defective fuel pellets of $UO_2$ or $UO_2$ containing an oxide of plutonium, gadolinium or erbium, consisting essentially of the following steps
   (a) heating said defective fuel pellets at a temperature in the range of about 300° C. to about 800° C. in an oxidizing gas to oxidize $UO_2$ to $U_3O_8$ in order to make fuel particles of $U_3O_8$ or $U_3O_8$ containing an oxide of plutonium, gadolinium or erbium;
   (b) mixing said fuel particles with fresh fuel powder of $UO_2$ or $UO_2$ containing an oxide of plutonium, gadolinium or erbium to form a sintering powder;
   (c) mixing said sintering powder uniformly with a sintering aid, which sintering aid comprises an element selected from the group consisting of aluminum, magnesium, niobium, titanium, vanadium, chromium, lithium, silicon, tin and mixtures thereof, to make a product A;
   (d) pressing said product A into green pellets of about 40% to about 65% theoretical density; and thereafter
   (e) sintering said green pellets at a temperature in the range of about 1500° C. to about 1 800° C. in a reducing atmosphere to produce new fuel pellets.

20. The method of claim 19, wherein said sintering step is carried out for about 1–20 hours.

21. The method of claim 19, wherein said fuel particles are reduced to a lower oxidation state to produce an oxide B before step (b).

22. The method of claim 21, further consisting essentially of oxidizing and reducing said oxide B at least once before step (b).

23. The method of claim 19, further consisting essentially of screening said fuel particles to remove agglomerates before step (b).

24. The method of claim 19, wherein said fuel particles are milled before step (b).

25. The method of claim 24, wherein said screening step is conducted by passing said fuel particles through a 200 mesh sieve.

26. The method of claim 19, wherein said sintering powder consists of about 10% to about 100% by weight of said fuel particles with the remainder being said fresh fuel powder.

27. The method of claim 19, wherein said sintering powder consists of about 10% to about 100% by weight of said fuel particles with the remainder being said fresh fuel powder and a grinding sludge.

28. The method of claim 19, wherein said sintering powder is mixed with an amount of said element of about 0.02% to about 2% by weight, based on the weight of said sintering powder.

29. The method of claim 28, wherein said sintering powder is mixed with niobium oxide in an amount, calculated as niobium, of about 0.1% to about 1% by weight, based on the weight of of said sintering powder.

30. The method of claim 28, wherein said sintering powder is mixed with a titanium oxide in an amount, calculated as titanium, of about 0.05% to about 1% by weight, based on the weight of said sintering powder.

31. The method of claim 19, wherein said reducing atmosphere is selected from the group consisting of hydrogen, a mixture of hydrogen and inert gases, a mixture of hydrogen and carbon dioxide, a mixture of hydrogen and carbon monoxide, and mixtures thereof.

32. The method of claim 31, wherein said sintering aid comprises an oxide of aluminum or magnesium and said reducing atmosphere consists of about 5% to about 40% carbon dioxide by volume and the remainder being hydrogen.

33. The method of claim 19, wherein water vapor is added to said reducing atmosphere to control the oxidation potential of said reducing atmosphere.

34. The method of claim 33, wherein water vapor is added to said reducing atmosphere in an amount yielding a reducing atmosphere with a dew point of about 20° C.

35. The method of claim 19, wherein said step (a) comprises heating said defective fuel pellets at a temperature in the range of about 350° C. to about 700° C. in flowing air to make fuel particles of $U_3O_8$ or $U_3O_8$ containing an oxide of plutonium, gadolinium or erbium.

36. The method of claim 19, wherein the oxidizing gas is selected from the group consisting of air, oxygen, a mixture of air and an inert gas, and a mixture of oxygen and an inert gas.

* * * * *